(12) United States Patent
Morse et al.

(10) Patent No.: US 6,280,613 B1
(45) Date of Patent: Aug. 28, 2001

(54) HYDRAULIC MEDIUM FILTERING FOR A MOTOR VEHICLE LIMITED SLIP DIFFERENTIAL

(75) Inventors: David M. Morse, Waterford, MI (US); Jun Yoshioka, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/401,465

(22) Filed: Sep. 22, 1999

(51) Int. Cl.$^7$ .................................................. F01M 1/10
(52) U.S. Cl. ..................... 210/168; 210/416.5; 475/159; 184/6.24
(58) Field of Search ................................ 210/168, 416.5; 180/76; 475/159; 184/6.21, 6.24, 106

(56) References Cited

U.S. PATENT DOCUMENTS

| 4,012,968 | 3/1977 | Kelbel . | |
|---|---|---|---|
| 4,033,872 | * 7/1977 | Mori ...................................... | 210/168 |
| 4,239,026 | * 12/1980 | Steicher et al. ...................... | 184/6.24 |
| 4,615,314 | * 10/1986 | Baugh .................................. | 184/106 |
| 4,878,924 | * 11/1989 | Yano et al. .......................... | 210/168 |
| 5,294,350 | * 3/1994 | Murphy et al. ...................... | 210/168 |

* cited by examiner

Primary Examiner—David A. Simmons
Assistant Examiner—Frank M. Lawrence
(74) Attorney, Agent, or Firm—Oldham & Oldham Co., L.P.A.

(57) ABSTRACT

A limited slip differential for a motor vehicle having a hydraulic medium plenum and pickup tube assembly which draws hydraulic medium from an axle sump by a vacuum generated by a hydraulic pump and transports the hydraulic medium to a hydraulic pump intake sump reservoir, the hydraulic medium plenum pickup tube assembly having a cross-sectional configuration which maintains the desired hydraulic medium flow rate, while being "thin" in at least one direction to filter out particulate contamination.

17 Claims, 4 Drawing Sheets

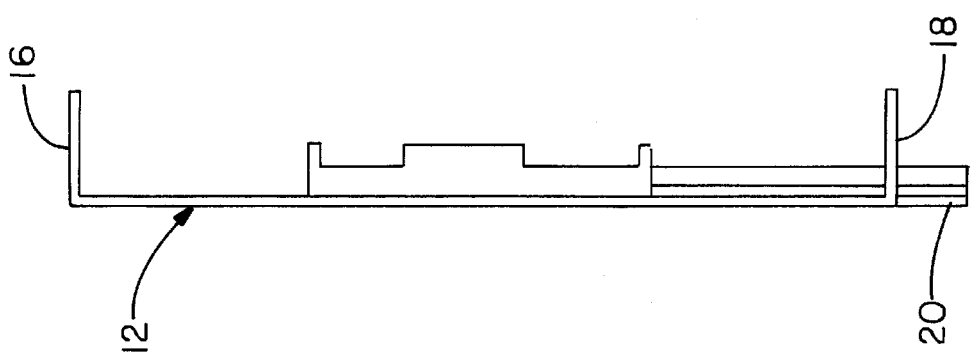
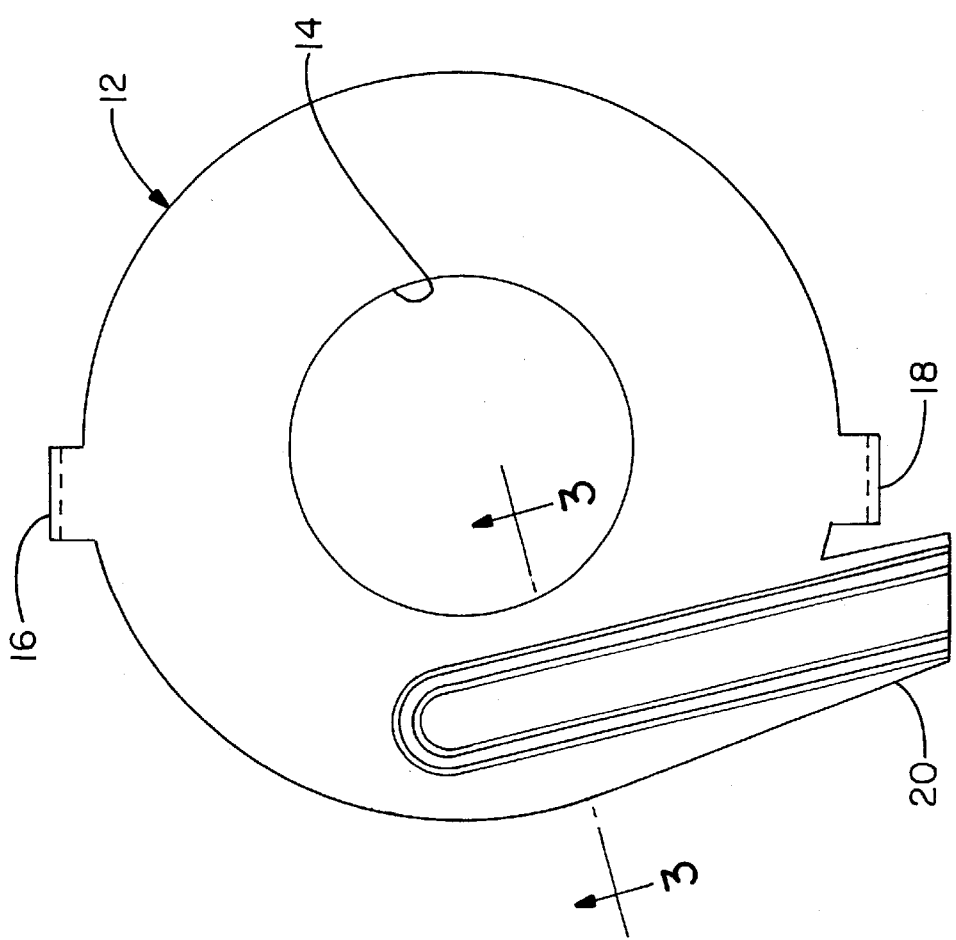

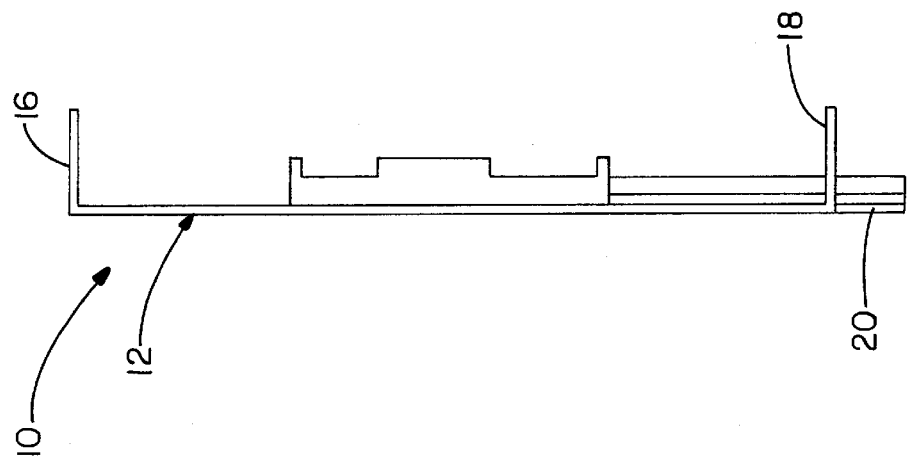
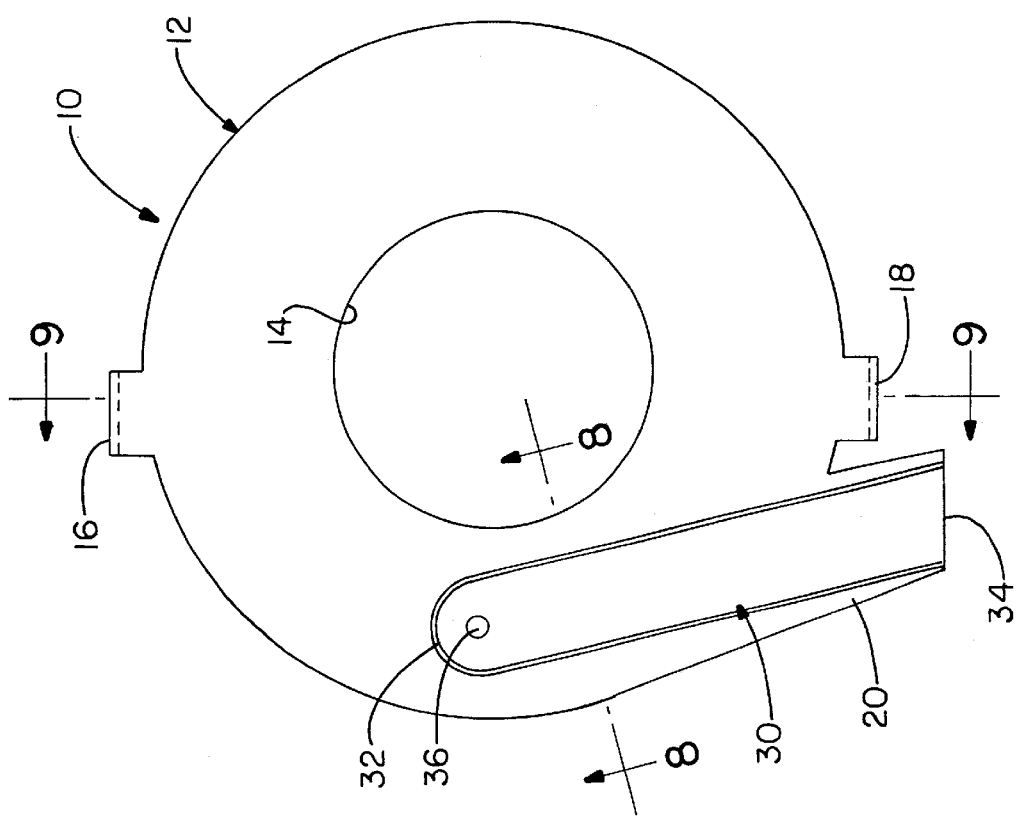

HYDRAULIC MEDIUM FILTERING FOR A MOTOR VEHICLE LIMITED SLIP DIFFERENTIAL

BACKGROUND AND SUMMARY OF THE INVENTION

The present invention relates generally to new and novel hydraulic filtering for a motor vehicle limited slip differential. More particularly, the present invention relates to new and novel hydraulic filtering for a motor vehicle limited slip differential which is particularly suitable for use in a motor vehicle limited slip differential which draws hydraulic medium from an axle sump by a vacuum generated by a hydraulic pump and transports the hydraulic medium to a hydraulic pump intake sump reservoir.

In many motor vehicle limited slip differentials, a pickup tube draws hydraulic medium from an axle sump by a vacuum generated by a hydraulic pump and transports the hydraulic medium to a hydraulic pump sump reservoir. Over time, the hydraulic medium tends to gather particulate contamination from, for example, foreign material which is introduced from outside the motor vehicle limited slip differential, oxidation or metallic particles removed from the internal components in the motor vehicle limited slip differential and foreign material which precipitates as solid material from the hydraulic medium itself. Such particulate contamination can, if not removed from the hydraulic medium, cause excessive wear and/or damage to the internal components of the motor vehicle limited slip differential.

Known prior art hydraulic fluid pickup tubes have generally had a circular or a square cross-sectional configuration, thus allowing all but the largest particulate contamination to pass therethrough. Thus, the remaining particulate contamination can cause excessive wear and/or damage to the internal components of the motor vehicle limited slip differential. In addition, large pieces of particulate contamination, which tend to be substantially spherical in configuration, may block all, or at least a substantial part of the hydraulic medium flow through the hydraulic medium pickup tube if caught or lodged therein. This can result in less than the desired rate of flow of hydraulic medium to the motor vehicle limited slip differential, again resulting in excessive wear and/or damage to the internal components of the motor vehicle limited slip differential.

A preferred embodiment of the present invention is, therefore, directed to a limited slip differential for a motor vehicle having a hydraulic medium plenum and pickup tube assembly which draws hydraulic medium from an axle sump by a vacuum generated by a hydraulic pump and transports the hydraulic medium to a hydraulic pump intake sump reservoir, the hydraulic medium plenum and pickup tube assembly having a cross-sectional configuration which maintains the desired hydraulic medium flow rate, while being "thin" in at least one direction to filter out particulate contamination.

Other advantages and novel features of the present invention will become apparent in the following detailed description of the invention when considered in conjunction with the accompanying drawings.

BRIEF DESCRIPTION OF THE DRAWINGS

FIG. 1 is a front elevational view of a first stamped part used to fabricate a hydraulic medium plenum and pickup tube assembly for a motor vehicle limited slip differential in accordance with a first preferred embodiment of the present invention.

FIG. 2 is a side elevational view of the first stamped part shown in FIG. 1 used to fabricate the hydraulic medium plenum and pickup tube assembly for a motor vehicle limited slip differential in accordance with the first preferred embodiment of the present invention.

FIG. 6 is a front elevational view of the hydraulic medium plenum and pickup tube assembly for a motor vehicle limited slip differential in accordance with the first preferred embodiment of the present invention.

FIG. 7 is a side elevational view of the hydraulic medium plenum and pickup tube assembly for a motor vehicle limited slip differential in accordance with the first preferred embodiment of the present invention shown in FIG. 6.

DETAILED DESCRIPTION OF THE DRAWINGS

Figure 3:
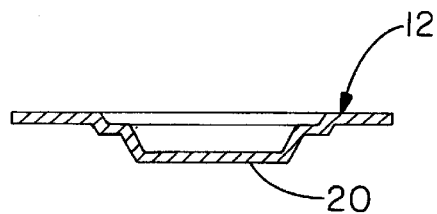
FIG. 3 is an enlarged cross-sectional view of the first stamped part, taken across line 3—3 in FIG. 1.

In the following detailed description of a first preferred embodiment and a second preferred embodiment of the present invention, reference is made to the accompanying drawings which, in conjunction with this detailed description, illustrate and describe a first preferred embodiment and a second preferred embodiment of a hydraulic medium plenum and pickup tube used for hydraulic filtering for a motor vehicle limited slip differential in accordance with the present invention. Referring now to the drawings, in which like-referenced characters indicate corresponding elements throughout the several views, attention is directed to FIGS. 6 through 9, which illustrate a front elevational view, a side elevational view, a first cross-sectional view and a second cross-sectional view, respectively, of a hydraulic medium plenum and pickup tube assembly for a motor vehicle limited slip differential in accordance with a first preferred embodiment of the present invention, generally identified by reference number 10. Hydraulic medium plenum and pickup tube assembly 10 is preferably fabricated from first stamped part 12 and second stamped part 30.

Referring now to FIGS. 1 through 3, which show a front elevational view, a side elevational view and a cross-sectional view, respectively, of first stamped part 12 used to fabricate hydraulic medium plenum and pickup tube assembly 10 in accordance with the first preferred embodiment of the present invention, first stamped part 12 is substantially circular in configuration and includes central opening 14, first retaining tab 16, second retaining tab 18 and outwardly extending hydraulic medium pickup tube 20. First stamped part 12 is preferably fabricated from a sheet metal material, most preferably steel, and is approximately five (5) inches in diameter and has a thickness in the range of 0.025 of an inch to 0.050 of an inch.

Figure 4:
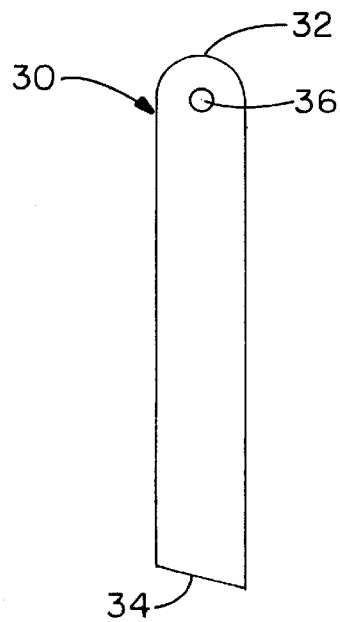
FIG. 4 is a plan view of a second stamped part used to fabricate the hydraulic medium plenum and pickup tube assembly for a motor vehicle limited slip differential in accordance with the first preferred embodiment of the present invention.
Figure 5:
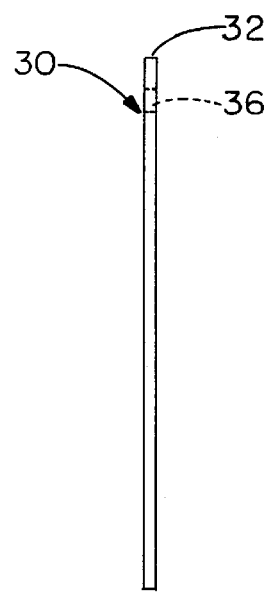
FIG. 5 is an edge view of the second stamped part shown in FIG. 4.
Figure 8:
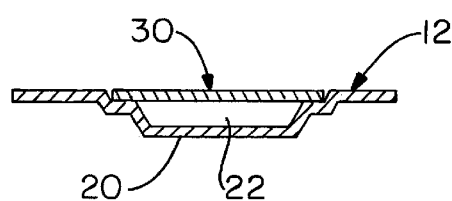
FIG. 8 is an enlarged cross-sectional view of the hydraulic medium plenum and pickup tube assembly for a motor vehicle limited slip differential in accordance with the first preferred embodiment of the present invention taken at line 8—8 in FIG. 6.
Figure 9:
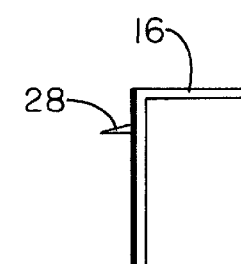
FIG. 9 is a cross-sectional view of the hydraulic medium plenum and pickup tube assembly for a motor vehicle limited slip differential in accordance with the first preferred embodiment of the present invention taken across line 9—9 in FIG. 6.

Referring now to FIGS. 4 and 5, which show a front elevational view and a side elevational view, respectively, of second stamped part 30 used to fabricate hydraulic medium plenum and pickup tube assembly 10 for a motor vehicle limited slip differential in accordance with the first preferred embodiment of the present invention, second stamped part 30 is substantially rectangular in configuration and includes radiused portion 32 at a first end thereof and angled portion 34 at a second end thereof.

Substantially circular opening 36, which is preferably approximately 0.150 of an inch in diameter, is located inwardly from radiused portion 32 at the first end of second stamped part 30. Second stamped part 30 is preferably fabricated from a sheet metal material, most preferably steel, is approximately two and one half (2 ½) inches long and approximately one quarter (¼) of an inch wide and has a thickness in the range of 0.025 of an inch to 0.050 of an inch.

Referring again to FIGS. 6 through 9, second stamped part 30 is attached on the top surface of outwardly extending hydraulic medium pickup tube 20 of first stamped part 12 to form hydraulic medium channel 22 therebetween. Second stamped part 30 is attached on the top surface of outwardly extending hydraulic medium pickup tube 20 of first stamped part 12 by a joining process, for example, welding, brazing or an adhesive, to form a continuous bond or seal between second stamped part 30 and outwardly extending hydraulic medium pickup tube 20 and thus create hydraulic medium channel 22 therebetween. Hydraulic medium channel 22 preferably has a cross-sectional dimension in a first direction which is significantly less than a cross-sectional dimension in a second direction which is substantially perpendicular to the first direction. More preferably, hydraulic medium channel 22 has an oblong or a substantially rectangular configuration such that the "thin" cross-sectional direction filters out particulate contamination in the hydraulic medium while maintaining the desired hydraulic medium flow rate. In addition, first retaining tab 16 and second retaining tab 18 in first stamped part 12 preferably include continuous mold surface 24 on an outer surface thereof and continuous mold surface 24 preferably includes inside diameter seal 26 and outside diameter seal 28.

Figure 11:
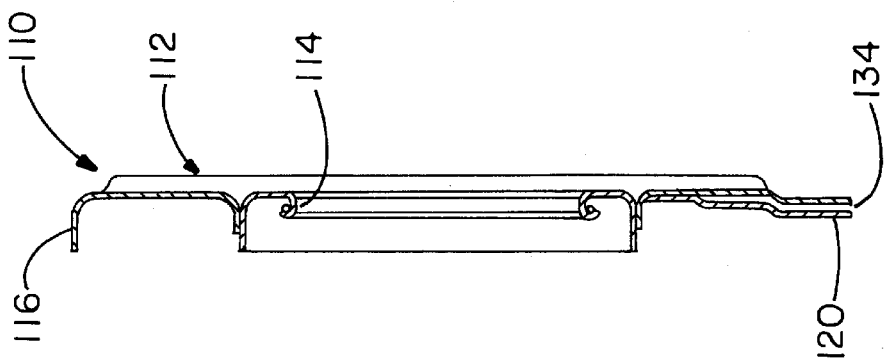
FIG. 11 is a side elevational view in cross-section of the hydraulic medium plenum and pickup tube assembly for a motor vehicle limited slip differential in accordance with the second preferred embodiment of the present invention taken at line 11—11 in FIG. 10.
Figure 10:
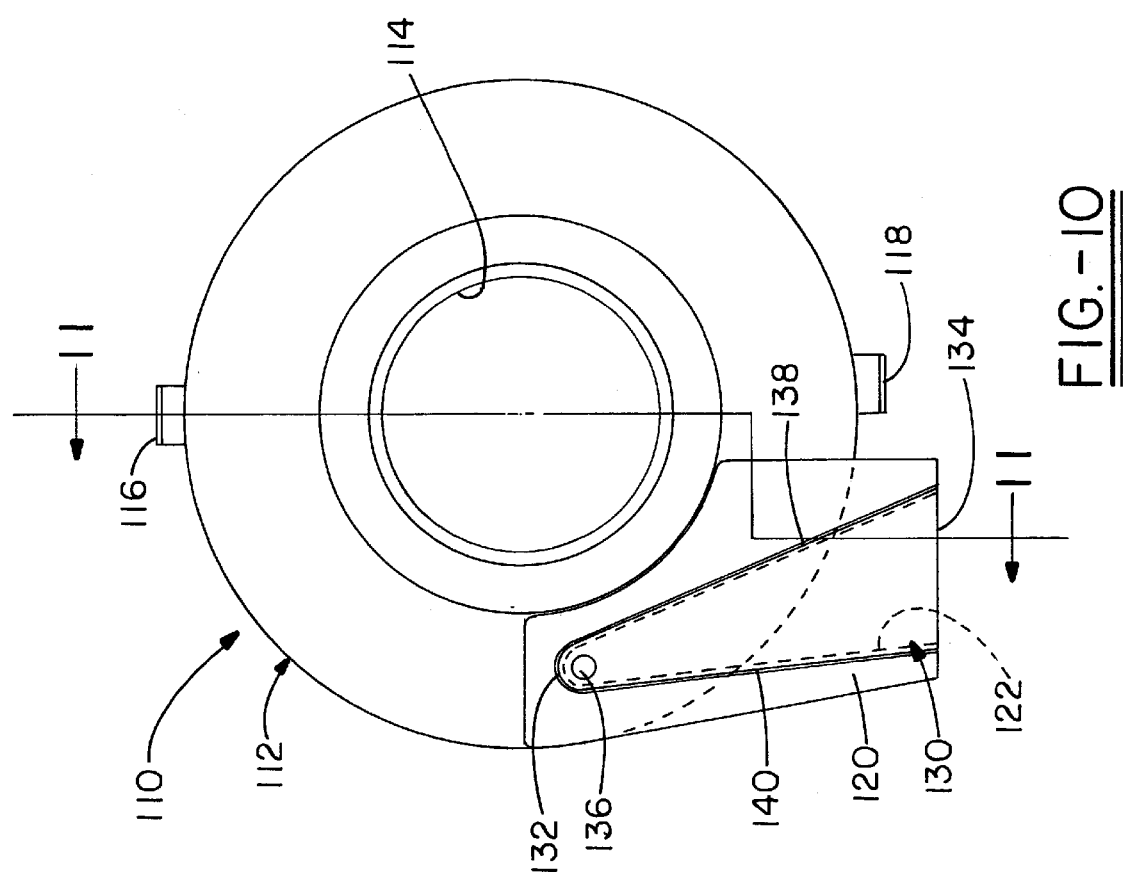
FIG. 10 is a front elevational view of a hydraulic medium plenum and pickup tube assembly for a motor vehicle limited slip differential in accordance with a second preferred embodiment of the present invention.

Referring now to FIGS. 10 and 11, which show a front elevational view and a side elevational view, respectively, of a hydraulic medium plenum and pickup tube assembly for a motor vehicle limited slip differential in accordance with a second preferred embodiment of the present invention, generally identified by reference number 110. Hydraulic medium plenum and pickup tube assembly 110 is preferably fabricated from first stamped part 112 and second stamped part 130. First stamped part 112 is substantially circular in configuration and includes central opening 114, first retaining tab 116, second retaining tab 118 and outwardly extending hydraulic medium pickup tube 120. First stamped part 112 is preferably fabricated from a sheet metal material, most preferably steel, and is approximately five (5) inches in diameter and has a thickness in the range of 0.025 of an inch to 0.050 of an inch. Second stamped part 130 preferably includes radiused portion 132 at a first end thereof and angled portion 134 at a second end thereof. Substantially circular opening 136, which is preferably approximately 0.150 of an inch in diameter, is located inwardly from radiused portion 132 at the first end of second stamped part 130. Second stamped part 130 also includes first side surface 138 which is angled in relation to second side surface 140 and thus first side surface 138 becomes closer to second side surface 140 as one approaches radiused portion 132 of second stamped part 132. Second stamped part 130 is preferably fabricated from a sheet metal material, most preferably steel, and is approximately two and one half (2 ½) inches long and its width ranges from approximately one quarter (¼) of an inch to one half (½) of an inch. Second stamped part 130 is attached on the top surface of outwardly extending hydraulic medium pickup tube 120 of first stamped part 112 by a joining process, for example welding, brazing or an adhesive, to form a continuous bond or seal between second stamped part 130 and outwardly extending hydraulic medium pickup tube 120 and thus create hydraulic medium channel 122 therebetween. Hydraulic medium channel 122 preferably has a cross-sectional dimension in a first direction which is significantly less than a cross-sectional dimension in a second direction with is substantially perpendicular to the first direction. More preferably, hydraulic medium channel 122 has an oblong or a substantially rectangular configuration such that the "thin" cross-sectional direction filters out particulate contamination in the hydraulic medium while maintaining the desired hydraulic medium flow rate. In addition, hydraulic medium channel 122 has a decreasing cross-sectional area as one moves towards radiused portion 132 to facilitate the filtering of particulate contamination present in the hydraulic medium while maintaining the desired hydraulic medium flow rate.

Although the present invention has been described above in detail, the same is by way of illustration and example only and is not to be taken as a limitation on the present invention. For example, changes in the size, configuration and cross-sectional area of the hydraulic medium pickup tubes in hydraulic medium plenum and pickup tube assembly 10 and 110 could be readily made to filter out particulate contamination which is greater than a predetermined minimum size. In addition, other manufacturing methods other than stamping could be used to fabricate first stamped part 12 and 112 and second stamped part 30 and 130 in accordance with the present invention. Furthermore, other types of materials other than sheet metal and other materials other than steel could be used to fabricate first stamped part 12 and 112 and second stamped part 30 and 130. Hydraulic medium plenum and pickup tube assembly 10 and 110 could also be fabricated as a one piece part, if desired, rather than using first stamped part 12 and 112 and second stamped part 30 and 130. Accordingly, the scope and content of the present invention are to be defined only by the terms of the appended claims.

What is claimed is:

1. A hydraulic medium plenum and pickup tube assembly for hydraulic medium filtering for a motor vehicle limited slip differential, said hydraulic medium plenum and pickup tube assembly comprising a hydraulic medium pickup tube having a cross-sectional configuration which has a cross-sectional dimension in a first direction which is significantly less than a second cross-sectional dimension in a second direction which is substantially perpendicular to said first direction to filter particulate contamination from the hydraulic medium while maintaining the desired hydraulic medium flow rate.

2. The hydraulic medium plenum and pickup tube assembly in accordance with claim 1, wherein said cross-sectional configuration is a substantially oblong configuration.

3. The hydraulic medium plenum and pickup tube assembly in accordance with claim 1, wherein said cross-sectional configuration is a substantially rectangular configuration.

4. The hydraulic medium plenum and pickup tube assembly in accordance with claim 1, wherein said hydraulic medium plenum and pickup tube assembly is fabricated from a first stamped part and a second stamped part.

5. The hydraulic medium plenum and pickup tube assembly in accordance with claim 1, wherein said cross-sectional configuration has a substantially constant cross-sectional area.

6. The hydraulic medium plenum and pickup tube assembly in accordance with claim 1, wherein said cross-sectional configuration has a cross-sectional area which decreases as one moves inwardly towards said hydraulic medium plenum and pickup tube assembly.

7. The hydraulic medium plenum and pickup tube assembly in accordance with claim 1, wherein said hydraulic medium plenum and pickup tube assembly includes a first retaining tab and a second retaining tab.

8. The hydraulic medium plenum and pickup tube assembly in accordance with claim 1, wherein said hydraulic medium plenum and pickup tube assembly includes a first retaining tab and a second retaining tab and said first retaining tab and said second retaining tab each include a continuous mold surface having an inside diameter seal and an outside diameter seal.

9. A hydraulic medium plenum and pickup tube assembly for hydraulic medium filtering for a motor vehicle limited slip differential, the motor vehicle limited slip differential having a hydraulic medium sump containing hydraulic medium, the hydraulic medium plenum and pickup tube assembly comprising:

a hydraulic medium pickup tube having a cross-sectional configuration which has a cross-sectional dimension in a first direction which is significantly less than a second cross-sectional dimension in a second direction which is substantially perpendicular to the first direction to filter particulate contamination from the hydraulic medium while maintaining the desired hydraulic medium flow rate, the pickup tube having an inlet end and an outlet end, the inlet end being submerged in the hydraulic medium.

10. The hydraulic medium plenum and pickup tube assembly according to claim 9, further comprising: a plenum portion having a central aperture therein, the pickup tube extending outwardly from the plenum portion.

11. The hydraulic medium plenum and pickup tube assembly according to claim 10, wherein the pickup tube extends transversely to the central aperture.

12. The hydraulic medium plenum and pickup tube assembly according to claim 9, wherein the cross-sectional configuration is a substantially oblong configuration.

13. The hydraulic medium plenum and pickup tube assembly according to claim 9, wherein the cross-sectional configuration is a substantially rectangular configuration.

14. The hydraulic medium plenum and pickup tube assembly according to claim 9, wherein said cross-sectional configuration has a cross-sectional area which decreases from the pickup tube inlet end towards the pickup tube outlet end.

15. The hydraulic medium plenum and pickup tube assembly according to claim 9, wherein the hydraulic medium plenum and pickup tube assembly includes a first retaining tab and a second retaining tab.

16. The hydraulic medium plenum and pickup tube assembly according to claim 9, wherein the hydraulic medium plenum and pickup tube assembly includes a first retaining tab and a second retaining tab and the first retaining tab and the second retaining tab each include a continuous mold surface having an inside diameter seal and an outside diameter seal.

17. A hydraulic medium plenum and pickup tube assembly for hydraulic medium filtering for a motor vehicle limited slip differential, the motor vehicle limited slip differential having a hydraulic medium sump containing hydraulic medium, the hydraulic medium plenum and pickup tube assembly comprising:

a plenum portion having a central aperture therein; and a hydraulic medium pickup tube having a cross-sectional configuration which has a cross-sectional dimension in a first direction which is significantly less than a second cross-sectional dimension in a second direction which is substantially perpendicular to the first direction to filter particulate contamination from the hydraulic medium while maintaining the desired hydraulic medium flow rate, the pickup tube having an inlet end and an outlet end, the inlet end being submerged in the hydraulic medium, the pickup tube extending outwardly from the plenum portion.

* * * * *